(Model.)

A. M. ALLEN.
CALCULATING MACHINE.

No. 533,336. Patented Jan. 29, 1895.

3 Sheets—Sheet 1.

Witnesses:
Leonard L. Allen
J. S. McAllen

Inventor:
Arthur M. Allen (Model.)  A. M. ALLEN.  3 Sheets—Sheet 2.
CALCULATING MACHINE.
No. 533,336.  Patented Jan. 29, 1895.
Fig. 4.  Fig. 6.  Fig. 7.  Fig. 8.
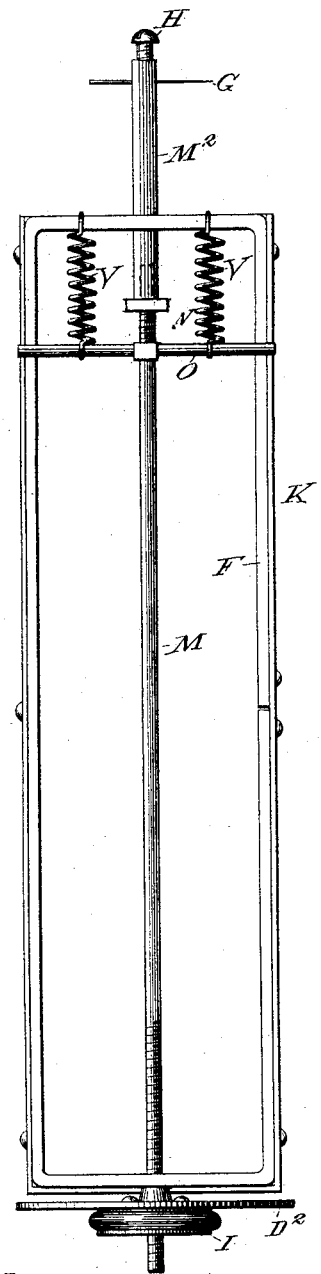
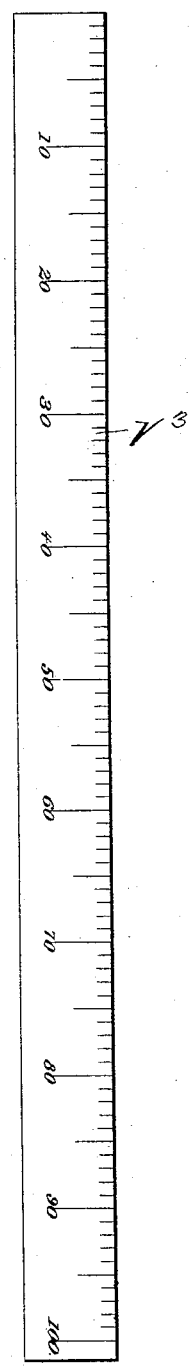
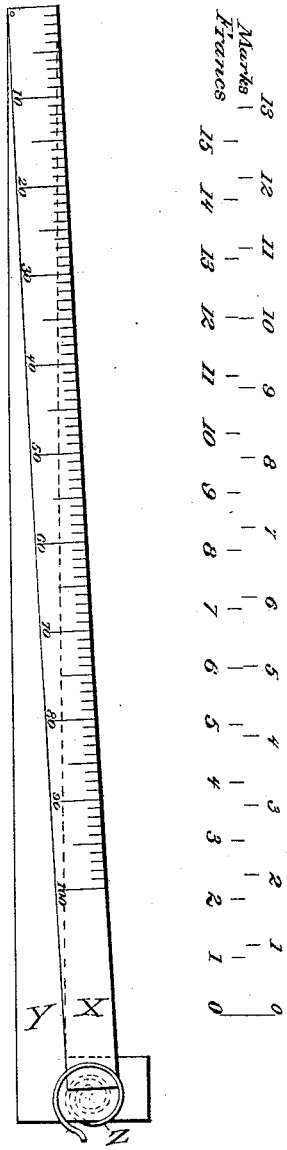
Witnesses:
Leonard L. Allen
J. S. McAllen
Inventor:
Arthur M. Allen (Model.)

3 Sheets—Sheet 3.

A. M. ALLEN.
CALCULATING MACHINE.

No. 533,336. Patented Jan. 29, 1895.

Witnesses:
Leonora L. Allen.
J. S. M. Allen.

Inventor:
Arthur M. Allen

UNITED STATES PATENT OFFICE.

ARTHUR M. ALLEN, OF NEW YORK, N. Y.

CALCULATING-MACHINE.

SPECIFICATION forming part of Letters Patent No. 533,336, dated January 29, 1895.

Application filed December 28, 1886. Serial No. 222,850. (Model.)

*To all whom it may concern:*

Be it known that I, ARTHUR M. ALLEN, a citizen of the United States, residing in the city, county, and State of New York, have invented a new and useful Calculating-Machine, of which the following is a specification.

My invention relates to the ascertainment of ratios (including proportion, percentage, exchange, and interest) and the principle is, the comparison with each other of two linear scales of different unit values, and the exact measurement of the observed fraction. This comparison is adjacent or distant as hereinafter described, and all scales must start from the same point or line called zero; said scales being each a series of spaces, whose measures are directly proportional to the values of some one kind of denominate numbers, and separated by any suitable divisions or limits, in this case lines being used, but points, or the space numbers themselves may serve. For fixed ratios, two fixed parallel linear scales are used, and for fluctuating ratios, one fixed scale is compared with an elastic scale parallel thereto, or with another fixed scale hinged on the zero point, so as to be used at a variable angle. I attain these objects by mechanism illustrated in the accompanying drawings, in which—

Figure 1:
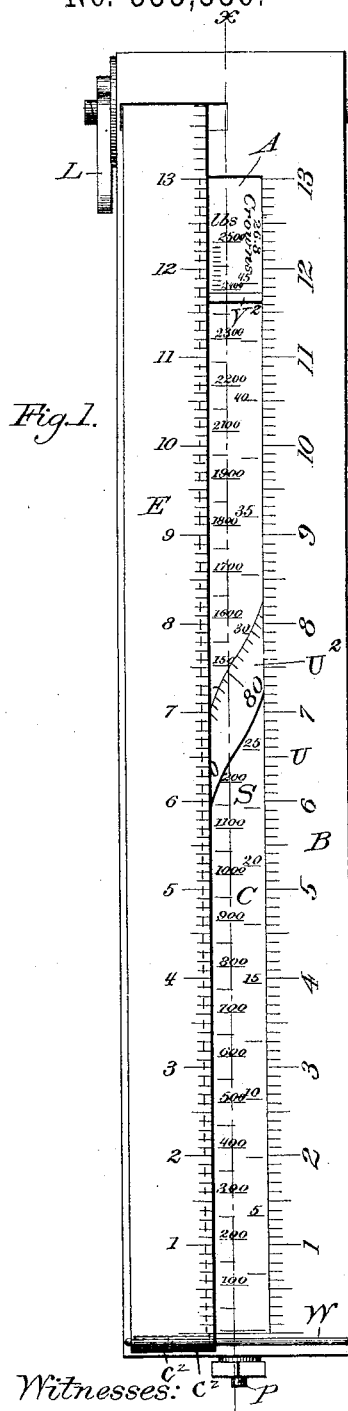
Figure 3:
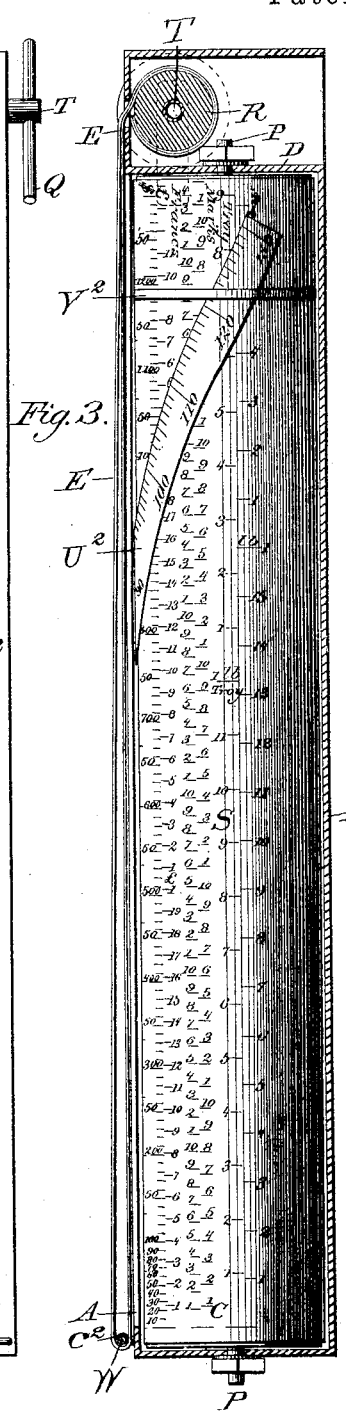
Figure 2:
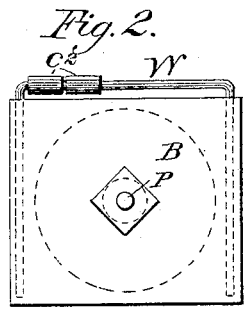
Figure 5:
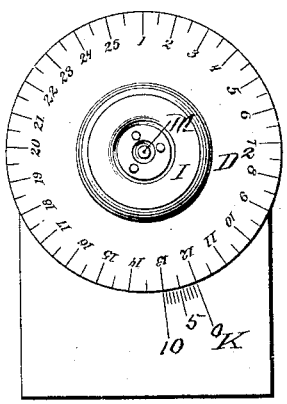
Figure 9:
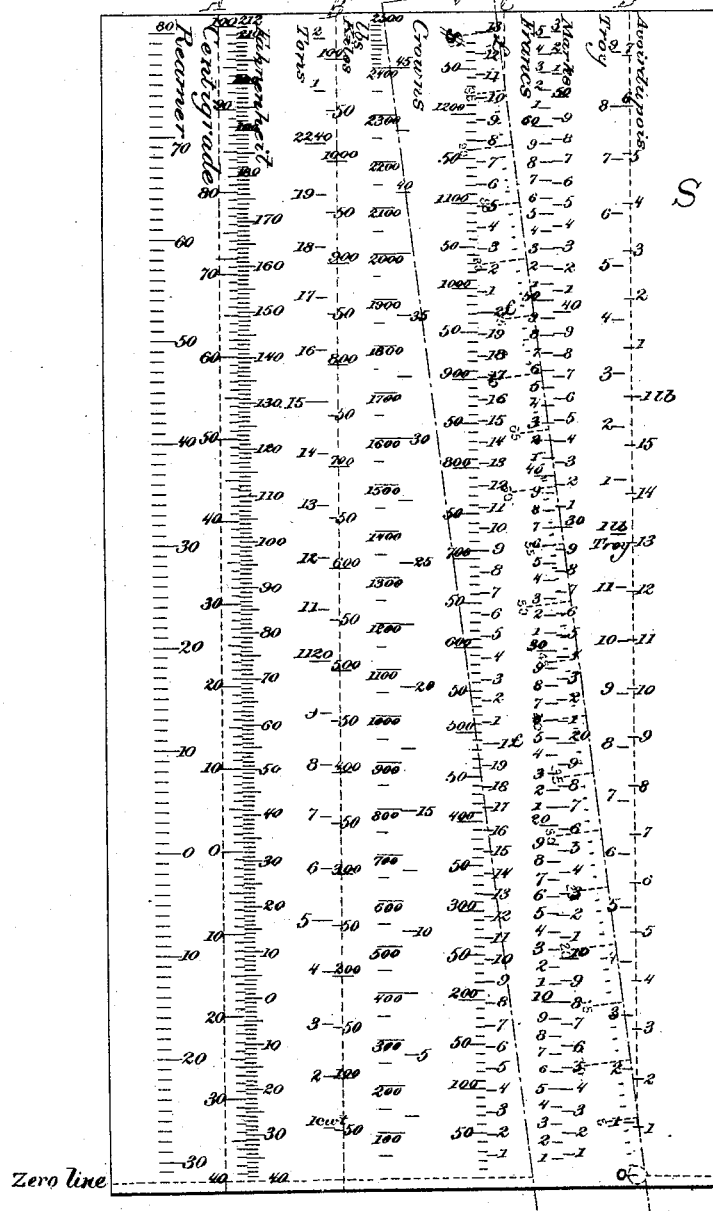

Figure 1 is a plan of scale box B. Fig. 2 is an end elevation of the same. Fig. 3 is a section of the invention as shown in Fig. 1 on the line $xx$. Fig. 4 is a plan of the micrometer, and its adjuncts. Fig. 5 is an end elevation of the same. Fig. 6 is a vernier $V^3$ showing 9.9 inches divided into one hundred parts. Fig. 7 is an adjustably inclined linear scale. Fig. 8 is a plan of two linear scales of different unit values, such as appear on the cylinder surface, for comparing different denominate numbers with each other, as dollars with pounds, Fahrenheit with centigrade, &c. Fig. 9 is a plan of part of cylinder scale sheet S laid out flat for better observation, and showing the hinged scale $U^2$ pivoted thereon through its zero point.

The same letters refer to the same or similar parts throughout the several views.

All the scales are made from the inch and its decimals as the general unit of comparison, and must of course be mathematically exact up to ten places of figures, which is the limit of the machine represented, and sufficient for general business purposes.

An oblong box B of suitable size and of any light material (preferably cardboard) has a slot A cut lengthwise in its top. Near one end of said box B is a transverse partition D, through which and through the other end of the box, a pivot P passes supporting a cylinder C, of which a section appears through the slot A. Upon the cylinder C is secured a scale sheet S, on which are marked a series of denominate scales, for comparison with each other, and with scales U, $U^2$, and E, hereinafter more particularly described. This scale sheet is prepared as follows: Upon a rectangular sheet a line is drawn near and parallel to one end. This line I call the zero line. From this as the place of beginning other and transverse lines are drawn, as close to each other as the scale lines and numbers will permit. On opposite sides of each of these lines are marked scales of equal parts whose unit values correspond in parts of an inch to some one denominate number. For instance one side of one line has 11.9 inches divided into fifty equal parts to represent rixmarks, German currency, and on the other side 9.65 inches is divided into fifty equal parts to represent francs, French currency, and these divisions are continued the whole length of the line. These when numbered will show opposite any number of rixmarks on one side, that number of francs which is its equal in value. The other lines are similarly marked, such denominations being adjacent as are most frequently compared as pounds with kilos, Fahrenheit with centigrade, pounds with dollars, meters with yards, &c., scales not adjacent being compared when on the cylinder by turning it, when the needle point G will describe a line parallel to the zero line, or if the scale sheet is used flat it may be arranged on a sliding frame to pass under a stationary needle or straight edge.

A hole in the bottom of box B allows the cylinder C to be turned by the thumb and finger, to show any of its scales through slot A, or the pivot P may be provided with a finger button for this purpose. The scale sheet S may be wound on two transverse rolls to permit of extra length, like a wide tape line, which may be advisable to use in some cases without the fraction reading devices, or on two cylinders C, to permit of extra width thereof, or it may be passed through slots in the sides of the box B.

On one edge of the slot A is marked a decimal scale U, and on the other edge is a scale E, marked on a ribbon of rubber, or other uniformly elastic material, the latter in this example being doubled and the loop passed around a wire rod W, fixed transversely at one end of the box B, both of its loose ends being cemented to a roller R, which is mounted on a transverse shaft T at the other end of box B. Two sleeves $C^2 C^2$ are fitted loosely on the wire rod W under said loop of the ribbon E to allow lateral contraction thereof while stretching.

A handle Q on the roller shaft T allows the roller R to be revolved for stretching the scale ribbon E; and to allow said roller to be secured in any position the shaft is threaded and provided with a lock-nut L. When the scale ribbon E is looped, the two halves thereof may be cemented together for more uniform elasticity, or a single heavy ribbon specially prepared for uniform texture may be used.

In operation the scale E is stretched until the first term of a proportion on it, is opposite the second term on the scale U, or opposite a like term on the scale sheet S, when the third term on scale E will be opposite the fourth term on the scale U or the scale sheet S, the fraction being read off either by the vernier Fig. 6, the adjustably inclined scale Fig. 7, or by a micrometer hereinafter described, one or more of said devices being used, according to the number of places of figures required; the vernier $V^3$ and adjustable scale being for few places of figures only, and the micrometer with or without the vernier $V^3$ or adjustable scale, for larger numbers up to ten places of figures. For ratios where the first and second terms are nearly equal, an extra linear scale $U^2$ is hinged to the cylinder C on the zero line, by a pivot through its zero point and the free end set so that the second term will pass under the needle point G of the micrometer, which has been set to the first term on another scale, said free end being kept in place by an elastic ring $V^2$ fitted on the cylinder, or by other suitable means. Then when the needle has been set to the third term on the fixed scale, the fourth term will be found on the hinged scale, where it passes under the needle point.

In using the inclined scale X, it is adjusted on its back piece Y by a spiral clamp Z, so that the difference of its widths at 0 and 100 shall be equal to the desired single division on any scale, across which it is transversely placed, thereby enabling its fractions to be read to one hundred parts. The vernier $V^3$ Fig. 6 is used on the scale U or on the adjustable scale Fig. 7.

Around the top of a case K (which covers the box B and is also of light material), is secured an oblong frame F, a little above the level of the top of the box B. Through the ends of said frame F, holes are bored for the passage of a micrometer rod M and a needle tube $M^2$ which is screwed upon said rod and locked by a nut N. The outer end of the needle tube $M^2$ carries a transverse needle G, which is held in position by a set screw H, whereby and by the locknut N, said needle can be set to point closely on any of the scales. A cross bar O passing through a block fixed on the micrometer rod M prevents rotary motion of the rod M, its ends being close to and above the frame F. The free end of the micrometer rod M is threaded and provided with a threaded block or wheel I, to which is secured an index or dial $D^2$, divided into twenty-five equal spaces, and on the adjacent end of case K, is marked a subdivision of ten parts marked 1, 2, 3, 4, 5, 6, 7, 8, 9, 10 which with the rod-thread (forty to the inch) enables the distance traversed by the needle point, to be measured to the ten thousandth part of an inch.

In using the scale sheet S with the micrometer the box B is slid into the case K until the needle G points to the required denominate number on one scale on the cylinder, which latter is then revolved until the scale to be compared is under the needle point. The index wheel I is then revolved until the needle points to the next division line, and the fraction is read off on the dial $D^2$.

When the cylinder scales are to be compared with the scales E or U, the nut N is loosened by the fingers to allow the tube $M^2$ to turn slightly. Springs V extending from cross bar O to the tube end of frame F, keep the index wheel I close against said frame, and the proper end of the case.

Other dials marked as needed may be slipped on the wheel I for use with different scales A, B, C, D, of the sheet S on the cylinder. By these means the interchanging of the values of denominate numbers, becomes easily familiar. "The rule of three" is no longer a puzzle, and errors are reduced to a mimimum, close observation only being needed for the ascertainment of ratios, the spaces between the linear scales marked on the scale sheet S, box B and ribbon E, being directly proportional to the value of the arithmetical quantities involved. It has nothing in common with "Gunter's scale" or its improvements, or with any of the recently invented percentage machines but is as simple as two piles of brick of different sizes, laid up abreast, and the counting of each pile to know how many of one kind are equal to so many of the other kind. Measuring instruments with scales marked thereon are very old. Instead of using them for their intended purpose, where one is applied to the object of measurement, I take two of them unlike each other, not for measuring purposes, but to compare with each other and thereby to measure not objects but quantities, in short to apply the two foot rule directly to arithmetic itself and make multiplication and division (within certain limits) simpler than addition. This has not been done yet by others, to my knowledge. In the scale sheet S these scales are shown in pairs with spaces corresponding in size to "francs," "marks," "£," "$," "lbs.," "kilos," "centigrade," &c.

For general illustration take two drawing scales one of sixty and one of forty parts to the inch. Lay their edges together with the zeros coincident. It is evident on inspection that ten inches from the zero point 600 on one scale is opposite 400 on the other and opposite 300 on one, 200 on the other, also opposite 75 on one, 50 on the other and so on; also on the scale sheet S at the same distance from the zero line will be found £10 and $48,665, at another 100 marks and $23.80, at another 100 francs and $19.30, at another 100 kilos and 220.46 lbs. In each of these cases the required quantity of one denomination is instantly found opposite the given quantity of the other, and by setting the needle close to the cylinder and turning the cylinder on its axis, the value of a quantity of any one denomination in terms of any other is at once readable. This is the operation of the machine in the matter of fixed ratios only.

For ordinary proportion or fluctuating ratio the elastic scale E is used as follows: To solve the proportion one hundred and twenty is to sixty-seven as eighty-three is to —, the elastic ribbon E is stretched by roller R till 67 on it is opposite 120 on the scale U, and secured by locknut L, then opposite 83 on scale U will be found the answer $46\frac{1}{3}$ nearly on the scale E.

The hinged scale $U^2$ which is pivoted on the zero line of scale sheet S is used as follows: If sixty pounds of wheat cost sixty-seven cents what will seventy-seven pounds cost? Set the needle by sliding the box B into case K till 60 on the scale nearest equal to the hinged scale $U^2$ is under it. Turn hinged scale $U^2$ on its pivot till 67 on it just passes under the needle as the cylinder turns and adjust the elastic band; then slide box B into case K till the needle points to 77 on the first scale and revolve the cylinder again till hinged scale $U^2$ is under the needle which will then point to 86 the answer thereon.

In comparing these scales, four variations of position occur, first, contiguous throughout and parallel; second, distant and parallel; third, oblique with zero points coincident; fourth, distant oblique, the zero points in all cases being in one and the same zero line, which feature is the distinguishing mark separating this invention from all others. To indicate the exact points of comparison lines are used, in this case imaginary ones, as the turning of the cylinder under the needle point describes them, but when the scale sheet is used flat, then a material line as a ruler edge or thread is used with means for their parallel motion or its equivalent.

I am aware that scales have been used in calculators before now, but diligent search on my part has not discovered anything in any way resembling the combination and mode of operating herein shown and described. Therefore,

What I claim as my invention, and desire to secure by Letters Patent, is—

1. An elastic scale with divisions marked thereon, in combination with means to stretch it and retain it in different positions, and with another marked scale the zero points of both scales being arranged abreast or coincident, for the purpose of ascertaining ratios.

2. In a calculating machine, an elastic scale with divisions marked thereon, in combination with means to stretch it and retain it in different positions, and with another marked scale, both scales being arranged with their zero points abreast or coincident, and also with a fraction reading device, substantially as and for the purpose described.

3. The box or support B, having on its top the linear scale V, and at one end the wire rod W with loose collars $C^2$, in combination with the roller R shaft T handle Q locknut L and elastic linear scale E substantially as shown and for the purpose described.

4. The box B and linear scale U in combination with elastic linear scale E, roller R, shaft T, handle Q, and locknut L, and with a fraction reader.

5. In a calculating machine, a frame with a scale marked lengthwise on one of its sides, and inclosing a cylinder and scale sheet, mounted on a longitudinal pivot therein, all in combination with means to revolve the cylinder, and with a needle micrometer.

6. The box B slotted at A, and cylinder C carrying scale sheet S, in combination with the case K and a micrometer mounted therein.

7. In a calculating machine, a frame, a threaded rod mounted therein, and a threaded block on said rod, provided with a dial in combination with a needle holder and a needle, the whole composing a needle-micrometer.

8. The case K frame F rod M, cross bar O nut N needle tube $M^2$, needle G set screw H and springs V, in combination with the box B, cylinder C and linear scales.

9. In a calculating machine, a plane surface upon which a straight line called a zero line, and a scale transverse thereto are marked, the beginning of said scale being on the zero line, and an adjustable marked scale pivoted at its point of beginning, on said zero line, all in combination with a needle micrometer separate from both scales, and with means to cause the needle point to pass to and fro over said plane surface, in a right line and parallel to said zero line, substantially as shown.

10. In a calculating machine, a cylindrical surface having a marked scale fixed thereon, parallel to its axis, and another marked scale pivoted at its zero point, upon the zero point of the fixed scale, and provided with means to oscillate upon its axis, and secure the pivoted scale in different positions, and all in combination with a needle micrometer.

11. In a calculating machine, scale sheet S in combination with scale $U^2$, arranged upon its zero point coincident with the zero line of said sheet, with means to secure said scale $U^2$ at different angles, and with a separate needle micrometer and means to cause the needle to pass over the said scale sheet in a direction parallel to the zero line substantially as shown.

12. The cylinder C, scale sheet S and hinged scale $U^2$ in combination with box B fixed scale U and a micrometer substantially as shown and for the purpose set forth.

13. In a calculating machine, elastic scale E, roller R, shaft T, handle Q and locknut L in combination with a needle micrometer.

14. In a calculating machine, an elastic scale E, provided with means to stretch it and retain it in different positions, in combination with cylinder C scale sheet S and a fraction reader.

15. Cylinder C, and hinged scale $U^2$ in combination with box B, fixed linear scale U, and a needle micrometer.

ARTHUR M. ALLEN.

Witnesses:
JOHN L. M. ALLEN,
LEONARD L. ALLEN.